(12) United States Patent
Delaney et al.

(10) Patent No.: US 6,463,524 B1
(45) Date of Patent: Oct. 8, 2002

(54) SUPERSCALAR PROCESSOR AND METHOD FOR INCREMENTALLY ISSUING STORE INSTRUCTIONS

(75) Inventors: Maureen Delaney, Richmond, VT (US); Hung Qui Le, Austin, TX (US); Dung Quoc Nguyen, Austin, TX (US); Robert McDonald, Austin, TX (US); David W. Victor, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,607

(22) Filed: Aug. 26, 1999

(51) Int. Cl.$^7$ ............................................. G06F 13/364
(52) U.S. Cl. ...................................... 712/221; 712/215
(58) Field of Search ................................. 712/220, 221, 712/200, 203, 215, 202

(56) References Cited

U.S. PATENT DOCUMENTS

| | | | | |
|---|---|---|---|---|
| 5,673,427 A | * | 9/1997 | Brown et al. | 712/212 |
| 5,896,505 A | * | 4/1999 | Shimazaki | 709/213 |
| 5,918,034 A | * | 6/1999 | Petolino | 712/218 |
| 6,009,513 A | * | 12/1999 | Mahalingaiah et al. | 712/231 |
| 6,061,772 A | * | 5/2000 | Webber | 711/169 |
| 6,119,075 A | * | 9/2000 | Dean | 702/186 |
| 6,134,646 A | * | 10/2000 | Feiste | 712/23 |
| 6,163,821 A | * | 12/2000 | Keller | 710/57 |
| 6,189,089 B1 | * | 2/2001 | Walker | 712/218 |

* cited by examiner

Primary Examiner—Eric Coleman
(74) Attorney, Agent, or Firm—Anthony V. S. England; Bracewell & Patterson, L.L.P.

(57) ABSTRACT

A superscalar processor and method are disclosed for efficiently executing a store instruction. The store instruction is stored in an issue queue within the processor. A first part of the store instruction is issued from the issue queue to a first one of different execution units in response to a first operand becoming available. A second part of the store instruction is issued from the issue queue to a second one of the different execution units in response to a second operand becoming available. The store instruction is completed in response to executing the first part of the store instruction by the first one of the execution units and the second part of the store instruction by the second one of the execution units.

12 Claims, 4 Drawing Sheets

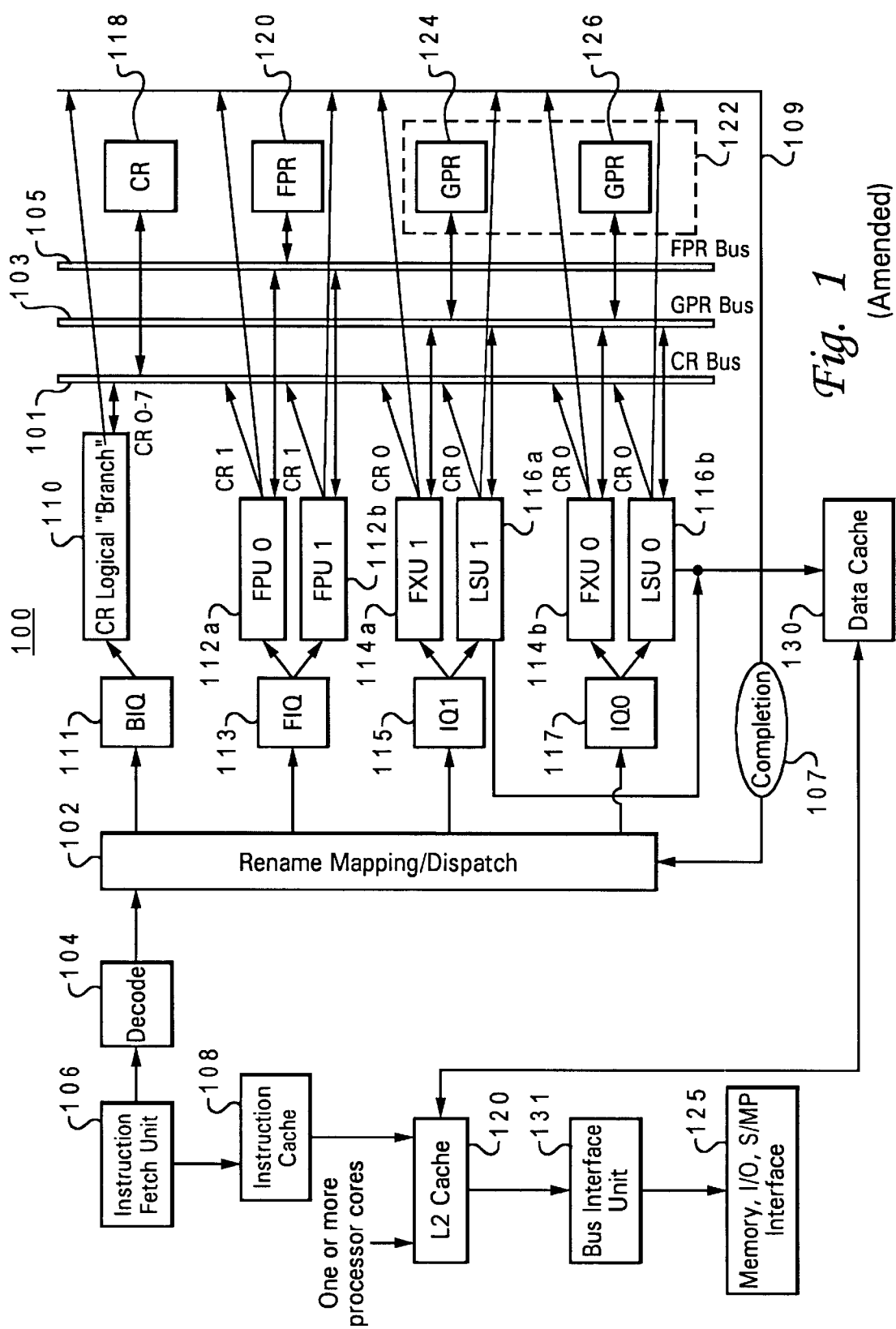
Fig. 1 (Amended)

SUPERSCALAR PROCESSOR AND METHOD FOR INCREMENTALLY ISSUING STORE INSTRUCTIONS

BACKGROUND OF THE INVENTION

1. Field of the Invention:

The present invention relates in general to a data processing system and, in particular, to a superscalar processor. Still more particularly, the present invention relates in general to a superscalar processor and method for efficiently executing a store instruction, wherein a part of the store instruction is executed prior to all of the store instruction's operands being available.

2. Description of the Related Art:

A superscalar data processing system is a data processing system which includes a microprocessor architecture which is capable of executing multiple instructions per clock cycle. In order to execute multiple instructions per clock cycle, multiple independent functional units that can execute concurrently are required. These multiple instructions may be executed in their original sequence, or out of order in a sequence which is different in some way from the original sequence.

Such a microprocessor architecture typically utilizes LOAD and STORE instructions to move data between storage locations such as main memory, cache, register locations, and/or other types of storage locations. A LOAD/STORE instruction includes an address of the data to be moved.

LOAD and STORE instructions are first dispatched from a dispatch buffer. They are then stored in one or two slots within an issue queue where they remain until the operands necessary to execute the instructions are available. For example, STORE instructions require two address operands or a single address operand and an immediate addressing value, and a data operand. The STORE instruction is received within the issue queue where it remains until all operands are available. When all the operands are available, including all data and address operands, the issue queue will issue the STORE instruction from the issue queue to a single execution unit for execution. When the instruction is issued, the issue queue slot or slots are then available for storing another instruction.

Therefore, a need exists for a data processing system and method for efficiently executing a store instruction, wherein a part of the store instruction is executed prior to all of the operands necessary to execute the store instruction being available.

SUMMARY OF THE INVENTION

A processor and method are disclosed for efficiently executing a store instruction. The store instruction is stored in an issue queue within the processor. A first part of the store instruction is issued from the issue queue to a first one of different execution units in response to a first operand becoming available. A second part of the store instruction is issued from the issue queue to a second one of the different execution units in response to a second operand becoming available. The store instruction is completed in response to executing the first part of the store instruction by the first one of the execution units and the second part of the store instruction by the second one of the execution units.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 1 illustrates a block diagram of a superscalar processor in accordance with the present invention;

DETAILED DESCRIPTION OF A PREFERRED EMBODIMENT

Figure 2:
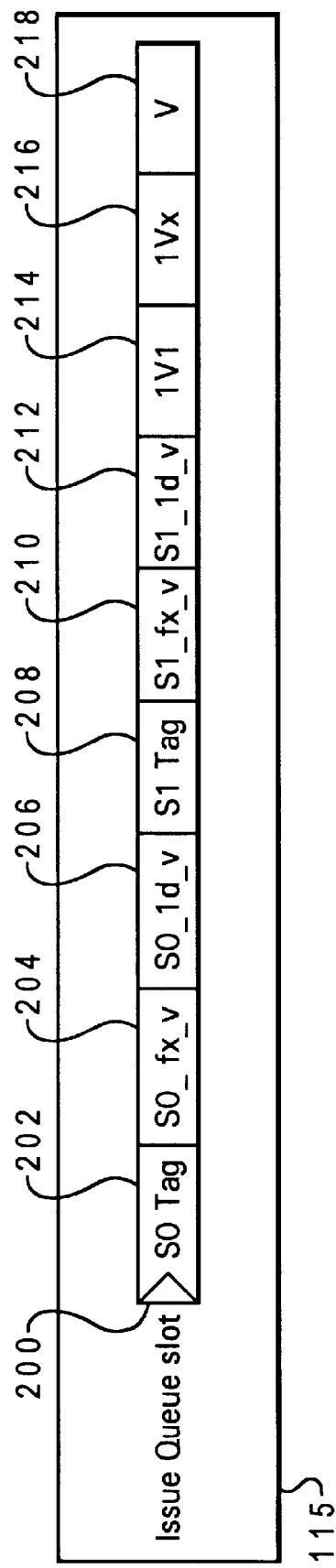
FIG. 2 depicts a pictorial representation of a slot within an issue queue for storing instructions prior to issuing the instructions for execution in accordance with the method and system of the present invention.

The present invention relates generally to a superscalar processor and more particularly to a system and method for improving the overall throughput in such a processor. The following description is presented to enable one of ordinary skill in the art to make and use the invention and is provided in the context of a patent application and its requirements. Various modifications to the preferred embodiment will be readily apparent to those skilled in the art. The generic principles herein may be applied to other embodiments. Thus, the present invention is not intended to be limited to the embodiment shown but is to be accorded the widest scope consistent with the principles and features described herein.

The present invention is a system and method in a superscalar processor for efficiently executing a store instruction, wherein a part of the store instruction is executed prior to all of the operands necessary to execute the store instruction being available. The store instruction is first dispatched as a single instruction to an issue queue, and stored within a storage slot in the issue queue. Two instructions are then issued from this same issue slot to different execution units. When the data operand becomes available, the data generation part of the STORE instruction is immediately issued to the fixed-point execution unit even though the address operand may not yet be available. When the address operand(s) becomes available, the address generation part of the STORE instruction is immediately issued to the LOAD/STORE execution unit even though the data operand may not yet be available.

In this manner, execution of STORE instructions is made more efficient because part of the STORE instruction may begin execution even though not all necessary operands are available for execution of the complete STORE instruction. Execution of a single STORE instruction may be completed as two separate and independent instructions executed simultaneously by different execution units.

In order to share the data operand of the STORE instruction with other fixed-point instructions, the data operand is stored in the issue queue slot which is typically used to store a second address operand.

A superscalar processor includes a number of stages, such as the following, in the processor pipeline. Each stage includes one or more pipelines. In a typical first stage, referred to as an instruction fetch stage, an instruction is fetched from memory or an associative memory structure. Then, in a decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched according to the control bits to a unit having an execution stage, or possibly to an intervening reservation station, which ultimately issues the instruction to an associated execution stage, also called an execution unit.

The execution stage processes the operation as specified by the instruction. Executing an operation specified by an instruction includes accepting one or more operands and producing one or more results in the order of available operands.

A completion stage deals with program order issues that arise from concurrent execution, wherein multiple, concurrently executed instructions may deposit results in a single register. It also handles recovery issues arising from instructions subsequent to an interrupted instruction depositing results in their destination registers.

FIG. 1 is a block diagram of a superscalar processor 100 in accordance with the present invention. The processor includes an instruction fetch unit (IFU) 106 which provides signals to a decode unit 104 which utilizes a rename mapping structure 102. The rename mapping structure 102 provides information directly to issue queue 111, 113, 115, and 117. The issue queues 111, 113, 115, and 117 in turn feed the execution units 110, 112a–b, 114a–b, and 116a–b.

Instruction cache 108 stores instructions received from IFU 106. Data cache 130 receives data from execution units 110–116. A level-two (L2) cache 120 is utilized to store data and instructions from data cache 130 and instruction cache 108. Processor 100 includes a bus interface unit (BIU) 131 which passes information between L2 cache 120 and the peripheral device interface 125.

In this embodiment, branch issue queue 111 provides information to the condition register (CR) logical or branch unit 110. Floating point issue queue (FIQ) 113 provides information to the two floating point units (FPUs) 112a and 112b. Issue queue (IQ) 115 provides information to fixed point unit (FXU) 114a and load/store unit (LSU) 116. IQ 117 provides information to FXU 114b and LSU 116b. Although the issue queues are arranged in the above-identified manner, one of ordinary skill in the art readily recognizes that the issue queues can be arranged in a different manner and that arrangement would be within the spirit and scope of the present invention.

Condition register (CR) 118 provides and receives information from a CR bus 101. Floating point architectural register (FPRs) 120 provide and receive information from a FPR bus 105. General purpose registers (GPRs) 124 and 126 provide and receive information from a GPR bus 103. Completion unit 107 provides information to rename mapping 102 via a completion bus 109.

Branch unit 110 provides and receives information via the CR bus 101 utilizing conditional registers 0–7.(CR0–7). FPU 112a and FPU 112b provides information to CR 118 via CR bus 101 utilizing conditional register 1. FPU 112a and 112b also receive and provide information from and to FPR pool 120 via FPR bus 105. FXU 114a, FXU 114b, LSU 116a, and LSU 116b output results to CR 118 via CR bus 101 utilizing conditional register 0. FXU 141a, FXU 146, LSU 116a, and LSU 116b also receive and provide information from and to GPR pool 122 via GPR bus 103. GPR pool 122 is implemented utilizing a shadow GPR arrangement in which there are two GPRs 124 and 126. All of the execution units 110–116 provide results to the completion unit 107 via completion bus 109.

FIG. 2 depicts a pictorial representation of a slot included within an issue queue for storing instructions prior to issuing the instructions for execution in accordance with the method and system of the present invention. A slot 200 is included for storing instructions in one of the issue queues, such as issue queue 115 or issue queue 117. Slot 200 includes a plurality of fields 202, 206, 208, 210, 212, 214, 216, and 218. Field 202 is utilized to store a first register address (RA) pointer S0 tag. Field 204 is utilized to store an indication, S0_fx_v, of whether or not field 202 includes valid data for a fixed-point instruction. Field 206 is utilized to store an indication, S0_ld_v, of whether or not field 202 includes valid data for a LOAD/STORE instruction.

Field 208 is typically utilized to store a second register address (RB) pointer S1 tag. However, in accordance with an important feature of the present invention, when the instruction stored in queue slot 200 is a STORE IMMEDIATE instruction, the data operand, RS, is stored in field 208. In this manner, the data operand, RS, is available to be accessed by other instructions during execution. Field 210 is utilized to store an indication, S1_fx_v, of whether or not field 208 includes valid data for a fixed-point instruction. Field 212 is utilized to store an indication, S1_ld_v, of whether or not field 208 includes valid data for a LOAD/STORE instruction.

Field 214 is utilized to store an indication, IVl, of whether or not, for this instruction, the instruction is valid to be issued to the LOAD/STORE execution unit for address generation. Field 216 is utilized to store an indication, IVx, of whether or not, for this instruction, the instruction is valid to be issued to the fixed-point execution unit for address generation. Finally, field 218 is utilized to store an indication, V, of whether or not this issue queue entry is valid.

In accordance with the present invention, two instructions are issued from issue queue slot 200. A first part of the STORE IMMEDIATE instruction is issued as an independently executable instruction in order to generate the address portion of the STORE IMMEDIATE instruction. A second part of the STORE IMMEDIATE instruction is issued as an independently executable instruction in order to generate the data portion of the STORE IMMEDIATE instruction.

Those skilled in the art will recognize that, although a STORE IMMEDIATE instruction is described, the present invention may be slightly modified to provide the same functionality for other types of STORE instructions.

In order to generate the first part of the instruction to generate the address, field 202 must include the address operand. Field 206 must be set to be valid indicating that field 202 is valid for a LOAD/STORE type of instruction. Field 214 must be set to be valid indicating that this instruction is valid to be issued to the LOAD/STORE execution unit. And, field 218 must be set to be valid indicating that this issue queue entry is valid. When the fields are set as described, the part of the STORE IMMEDIATE instruction for address generation is issued to the LOAD/STORE execution unit for execution. This part of the STORE IMMEDIATE instruction is issued to the LOAD/

STORE execution unit even though the data operand may be yet be available for processing.

In order to generate the second part of the instruction to determine the data, field 208 must include the data operand. Field 210 must be set to be valid indicating that field 208 is valid for a fixed-point type of instruction or for a STORE IMMEDIATE instruction. Field 216 must be set to be valid indicating that this instruction is valid to be issued to the fixed-point execution unit. And, field 218 must be set to be valid indicating that this issue queue entry is valid. When the fields are set as described, the part of the STORE IMMEDIATE instruction for determination of data is issued to the fixed-point execution unit for execution. This part of the STORE IMMEDIATE instruction is issued to the fixed-point execution unit even though the address operand(s) may be yet be available for processing.

Figure 3:
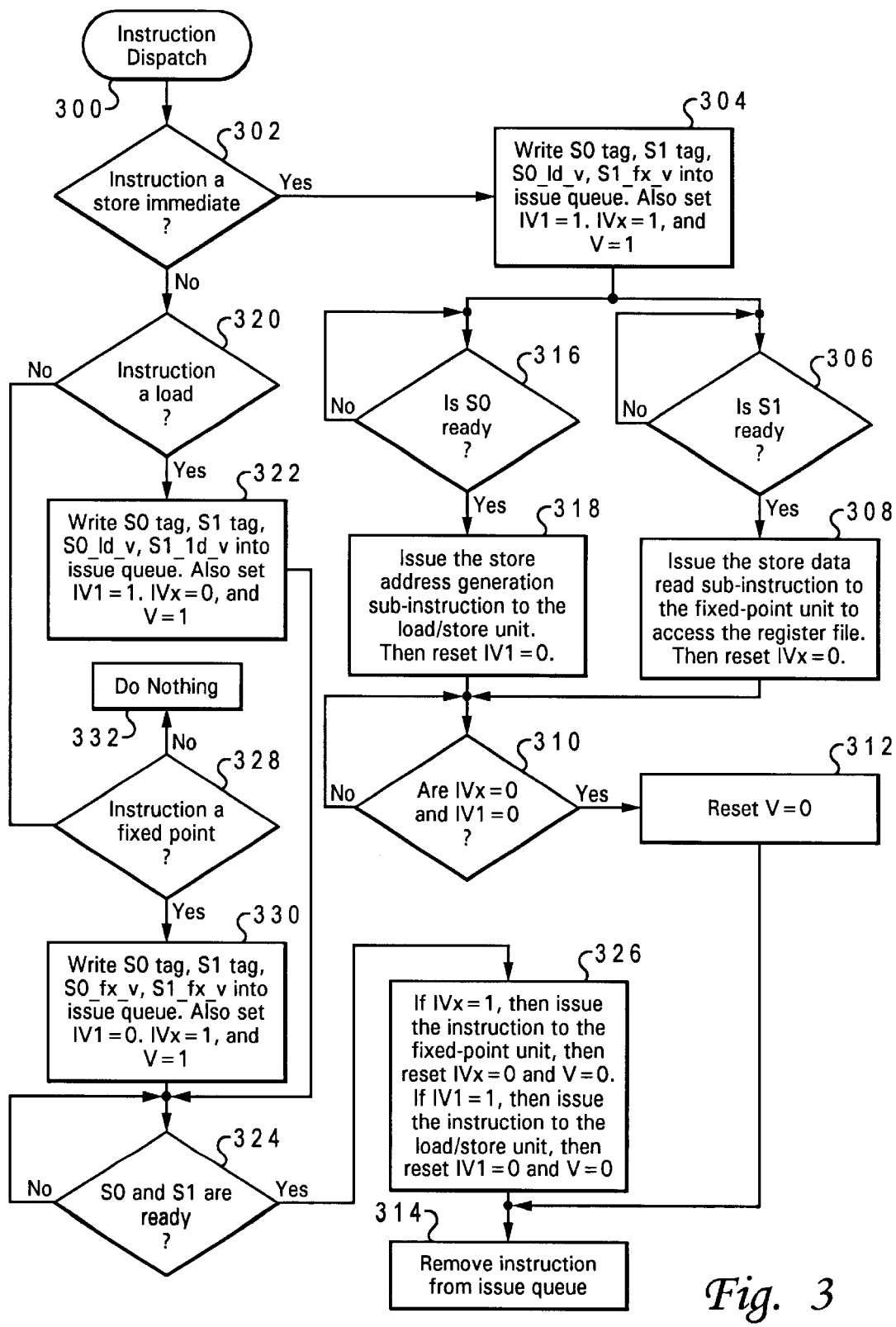
FIG. 3 illustrates a high level flow chart which depicts efficiently executing a store instruction, wherein a part of the store instruction is executed prior to all of a plurality of operands necessary to execute the store instruction being available in accordance with the method and system of the present invention.

FIG. 3 illustrates a high level flow chart which depicts efficiently executing a store instruction, wherein a part of the store instruction is executed prior to all of a plurality of operands necessary to execute the complete store instruction being available in accordance with the method and system of the present invention. The process starts as depicted at block 300 which illustrates the instruction dispatch buffer 102 dispatching an instruction to an issue queue, such as issue queue 115 or issue queue 117. Next, block 302 depicts a determination of whether or not the dispatched instruction is a STORE IMMEDIATE instruction. If a determination is made that the dispatched instruction is a STORE IMMEDIATE instruction, the process passes to block 304 which illustrates writing an S0 tag, an S1 tag, an S0_ld_v value, and an S1_fx_v value into one of the available slots in the issue queue. The STORE IMMEDIATE instruction, as described above in FIG. 2, includes an S0 tag which is the address pointer of a first address operand, and an S0_ld_v value which is set to be valid for LOAD/STORE instructions. The STORE IMMEDIATE instruction also includes an S1 tag which is the address pointer of a data operand, and an S1_fx_v value which is set to be valid for fixed-point instructions. When the STORE IMMEDIATE instruction is stored into the issue queue slot, the address pointer of the data operand is stored in the field for storing the second address operand. Therefore, the address pointer of the data operand is stored in field S1 tag. Block 304 also depicts storing a logical "1" in the IVl field which sets the field to be valid, storing a logical "1" in the IVx field which sets the field to be valid, and storing a logical "1" in the V field which sets the field to be valid. Setting these fields valid indicates that the STORE instruction is valid to be issued to the LOAD/STORE unit for address generation, and is valid to be issued to the fixed-point unit for fixed-point operations, or to read the STORE IMMEDIATE data. Setting field V indicates that this issue queue entry is valid.

The process then passes simultaneously to both block 306 and block 316. Block 306 illustrates a determination of whether or not the S1 operand is available. The S operand is the data operand. If a determination is made that the data operand is not available, the process loops back to block 306 until the data operand becomes available. When the data operand becomes available, the process passes to block 308. Block 308 depicts issuing one part of the STORE instruction which is the execution of the data associated with this STORE instruction. Therefore, when the data operand becomes available, one part of the STORE instruction is issued to the fixed-point execution unit to access the register file. Because this part of store instruction has been issued to the fixed-point execution unit, field IVx is then reset to be equal to a logical "0" to indicate that this instruction is no longer valid to be issued to the fixed-point execution unit.

The process then passes to block 310 which illustrates a determination of whether or not both fields IVx and IVl are both reset equal to a logical "0" indicating that the fields are invalid. Both fields will be invalid when both parts of the STORE instruction have been issued to the appropriate execution units. If a determination is made that both fields are not reset equal to a logical "0", the process loops back to block 310 until both fields are set to be invalid.

If a determination is made that both fields are reset equal to a logical "0" indicating that both parts of the STORE instruction have been issued to the appropriate execution units, the process passes to block 312. Block 312 depicts the resetting of field V equal to a logical "0" which indicates that this issue queue entry is no longer valid because it is has been completely issued. Thereafter, block 314 illustrates removing this instruction from the issue queue, thus making the slot available for the next instruction.

As described above, the process passes from block 304 to both block 306 and block 316 simultaneously. Block 316 illustrates a determination of whether or not the S0 operand is available. The S0 operand is an address operand. If a determination is made that the address operand is not available, the process loops back to block 316 until the address operand becomes available. When the address operand becomes available, the process passes to block 318. Block 318 depicts issuing one part of the STORE instruction which is the execution of the address associated with this STORE instruction. Therefore, when the address operand becomes available, one part of the STORE instruction is issued to the LOAD/STORE execution unit to calculate the address of the STORE instruction. Because this part of store instruction has been issued to the LOAD/STORE execution unit, field IVl is then reset to be equal to a logical "0" to indicate that this instruction is no longer valid to be issued to the LOAD/STORE execution unit. The process then passes to block 310. As described above, when both parts of the STORE instruction have been issued to the appropriate execution units, both fields IVx and IVl will be set to be invalid.

Referring again to block 302, if a determination is made that this instruction is not a STORE IMMEDIATE instruction, the process passes to block 320 which depicts a determination of whether or not this instruction is a LOAD instruction. If a determination is made that this instruction is a LOAD instruction, the process passes to block 322 which illustrates writing the S0 tag, S1 tag, S0_ld_v field, and S1_ld_v field into the queue slot in the issue queue. The field IVl is set equal to a logical "1", field IVx is set equal to a logical "0", and field V is set equal to a logical "1". In this manner, the address and data operands are stored in their appropriate fields, and the LOAD/STORE issue field is set to be valid. The fixedpoint issue field is set to be invalid. The issue entry field is set to valid indicating that this entry is valid.

The process then passes to block 324 which depicts waiting for the data and address operands, S0 and S1, to both become available. If a determination is made that either one or both of the operands are not currently available, the process loops back to block 324 until both operands are available. When both operands are available, the process passes to block 326 which illustrates issuing this instruction to the fixed-point execution unit when the IVx field is set equal to a logical "1", i.e. when this is fixed-point instruction. The IVx and V fields are then reset to a logical "0" indicating that the field is invalid because the instruction has been issued. Block 326 also illustrates issuing this instruction to the LOAD/STORE execution unit when the IVl field is set equal to a logical "1", i.e. when this is LOAD/STORE unit instruction. The IVl and V fields are then reset to a logical "0" indicating that the field is invalid because the instruction has been issued. The process then passes to block 314.

Referring again to block 320, if a determination is made that this is not a LOAD instruction, the process passes to block 328 which depicts a determination of whether or not this is a fixed-point instruction. If a determination is made that this is not a fixed-point instruction, the process terminates as illustrated at block 332. Referring again to block 328, if a determination is made that this is a fixed-point instruction, the process passes to block 330 which depicts writing the data and address operands, S0 tag and S1 tag, into the appropriate address and data fields in the issue slot. The IVl field is set equal to a logical "0" indicating that this is not a LOAD/STORE instruction. Field IVx is set equal to a logical "1" indicating that this is a fixed-point instruction. Field V is set equal to a logical "1" indicating that this issue queue entry is valid.

The process then passes to block 324 which illustrates a determination of whether or not both the data and address operands are currently available. As described above, if neither or one of the operands are not available, the process loops back to block 324 until both data and address are available. When both operands are available, the instruction can be issued to the fixed-point execution unit.

Figure 4:
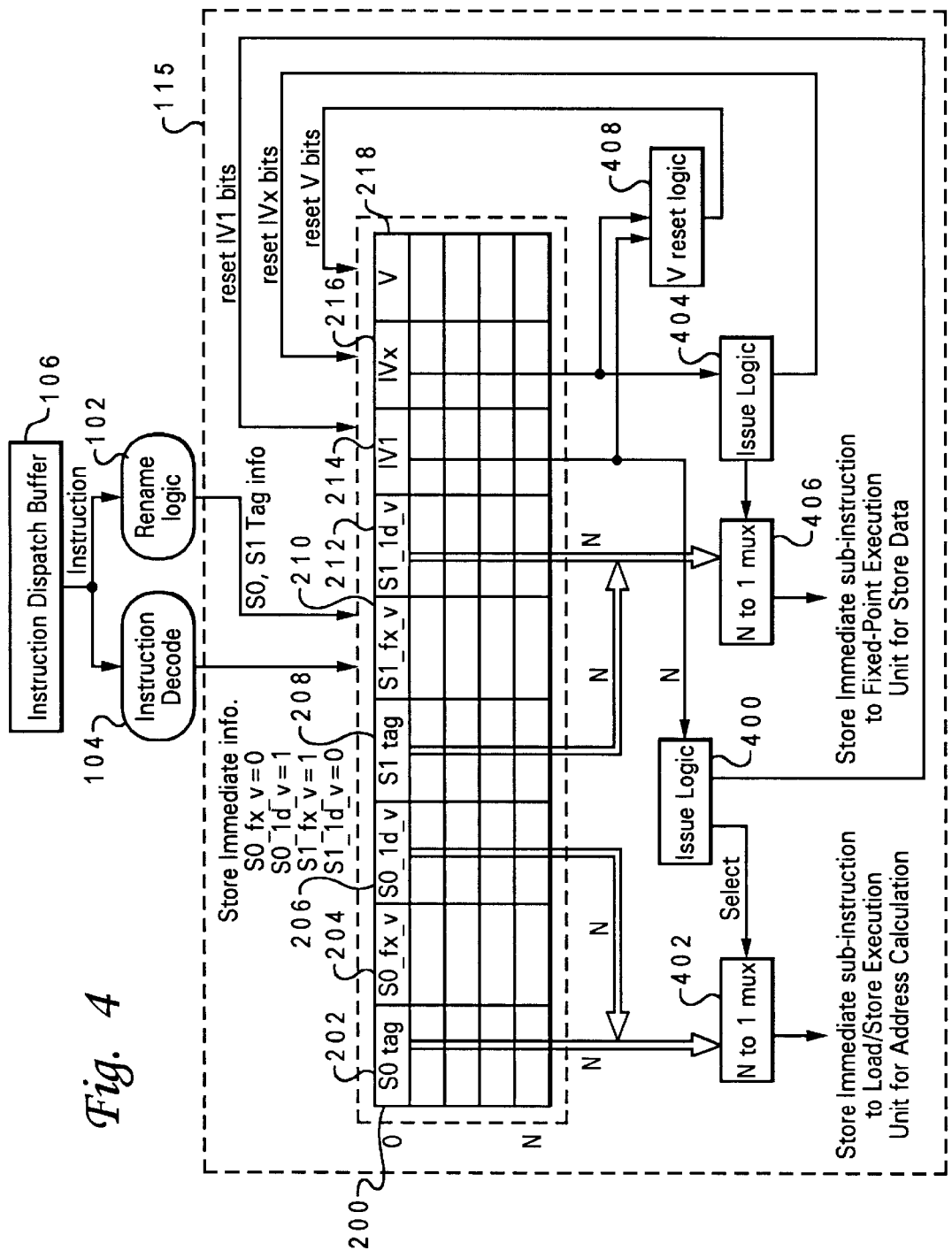
FIG. 4 illustrates a pictorial representation of an issue queue including issue logic necessary to separately issue independent parts of instructions in accordance with the method and system of the present invention.

FIG. 4 illustrates a pictorial representation of an issue queue including issue logic necessary to separately issue independent parts of instructions in accordance with the method and system of the present invention. As described above, the STORE IMMEDIATE instruction is dispatched through the instruction decode logic 104 and rename logic 102 to an issue queue, such as issue queue 115. Instruction decode logic 104 extracts the STORE IMMEDIATE information from the instruction, such as the S0__fx__v data, S0__ld__v data, S1__fx__v data,. For a STORE IMMEDIATE instruction, this data will be set as follows: S0__fx__v=0, S0__ld__v=1, S1__fx__v=1, and S1__ld__v=0. This data is received within the appropriate fields, as shown in FIG. 2, in issue queue 115. For example, issue queue may include fields 0 through N, as shown in FIG. 4. Rename logic 102 assigns registers for the S0 and S1 tags. This information is placed into the appropriate field within issue queue slot 200.

Fields 202 and 206 are received within a multiplexer 402 and selected by issue logic 400. Issue logic 400 selects an issue queue slot, such as entry 200, for calculation. Similarly, fields 208 and 212 are received within a multiplexer 406 and selected by issue logic 406. Issue logic 406 selects an issue queue slot, such as entry 200, for calculation.

The output of multiplexer 402 is one part of the original STORE IMMEDIATE instruction. For example, the output of multiplexer 402 is an instruction to calculate the address portion of the original STORE IMMEDIATE instruction. The output of multiplexer 406 is another, separate and independent part of the original STORE IMMEDIATE instruction. For example, the output of multiplexer 406 is an instruction to calculate the data portion of the original STORE IMMEDIATE instruction.

Issue logic 400 receives as its input a signal from field 214 which indicates whether the instruction stored in this instruction queue slot is valid for issue to the LOAD/STORE execution unit. Issue logic 404 receives as its input a signal from field 216 which indicates whether the instruction stored in this instruction queue slot is valid for issue to the fixed-point execution unit. Reset logic 408 receives two signals as its inputs, from fields 214 and 216. Issue logic 400 generates an output to reset the field 214 bits. Issue logic 404 generates an output to reset the field 216 bits. And, reset logic 408 generates an output to reset the field 218 bits.

While a preferred embodiment has been particularly shown and described, it will be understood by those skilled in the art that various changes in form and detail may be made therein without departing from the spirit and scope of the present invention.

What is claimed is:

1. A method in a processor for issuing multiple store instructions incrementally, said method comprising the steps of:

storing each of said multiple store instructions in a single issue queue instruction slot, wherein each of said single instruction slots includes an address operand field containing an address operand, a data operand field containing a data operand, an instruction load/store valid field, and an instruction fixed-point valid field;

multiplexing, from among said issue queue instruction slots, the contents of said address operand fields to select an address operand of one of said multiple store instructions in accordance with the contents of said instruction load/store valid fields;

issuing said selected address operand within an address generation sub-instruction to a load/store unit for execution;

multiplexing, from among said issue queue instruction slots, the contents of said data operand fields to select a data operand of one of said multiple store instructions in accordance with the contents of said instruction fixed-point valid fields; and issuing said selected data operand within a data generation sub-instruction to a fixed-point unit for execution.

2. The method according to claim 1, further comprising the steps of:

said load/store execution unit executing said address generation sub-instruction; and said fixed-point execution unit executing said data generation sub-instction independently from said load/store execution unit executing said address generation sub-instruction.

3. The method according to claim 2, further comprising the step of waiting for said data operand to become available before issuing said data generation sub-instruction, wherein data determined utilizing said data operand is to be stored at an address determined by executing said address generation sub-instruction of said store instruction.

4. The method according to claim 3, firther comprising the step of waiting for said address operand to become available to be used during execution of said address generation sub-instruction of said store instruction, wherein said address operand is utilized to determine said address at which to store said data.

5. The method according to claim 1, further comprising the step of storing said each of said multiple store instructions in a single slot in said issue queue within said processor, each of said slots having a plurality of fields including a data operand field for storing a data operand, a first address operand field for storing a first address operand, and a second address operand field for storing a second address operand, wherein said second address operand maybe an immediate address operand.

6. The method according to claim 5, flirther comprising the steps of:

storing said first address operand in said first address operand field; and storing said data operand in said second address operand field.

7. A processor for issuing multiple store instructions incrementally, said processor comprising:

an issue queue for storing said multiple store instructions, wherein said issue queue includes a single instruction slot for each of said multiple store instructions, said single instruction slot including an address operand field contained, a data operand field, an instruction load/store valid field, and an instruction fixed-point valid field;

means for multiplexing, from among said issue queue instruction slots, the contents of said address operand fields to select an address operand of one of said multiple store instructions in accordance with the contents of said instruction load/store valid fields;

means for issuing said selected address operand within an address generation sub-instruction to a load/store unit for execution;

means for multiplexing, from among said issue queue instruction slots, the contents of said data operand fields to select a data operand of one of said multiple store instructions in accordance with the contents of said instruction fixed-point valid fields; and means for issuing said selected data operand within a data generation sub-instruction to a fixed-point unit for execution.

8. The processor according to claim 7, further comprising:

means for said load/store execution unit executing said address generation sub-instruction; and means for said fixed-point execution unit executing said data generation sub-instruction independently from said load/store execution unit executing said address generation sub-instruction.

9. The processor according to claim 8, further comprising means for waiting for said data operand to become available before issuing said data generation sub-instruction, wherein data determined utilizing said data operand is to be stored at an address determined by executing said address generation sub-instruction of said store instruction.

10. The processor according to claim 9, further comprising means for waiting for said address operand to become available to be used during execution of said address generation sub-instruction of said store instruction, wherein said address operand is utilized to determine said address at which to store said data.

11. The processor according to claim 7, further comprising means for storing said each of said multiple store instructions in a single slot in said issue queue within said processor, each of said slots having a plurality of fields including a data operand field for storing a data operand, a first address operand field for storing a first address operand, and a second address operand field for storing a second address operand, wherein said second address operand may be an immediate address operand.

12. The processor according to claim 11, further comprising: means for storing said first address operand in said first address operand field; and means for storing said data operand in said second address operand field.

* * * * *

UNITED STATES PATENT AND TRADEMARK OFFICE
CERTIFICATE OF CORRECTION

PATENT NO. : 6,463,524 B1
DATED : October 8, 2002
INVENTOR(S) : Maureen Delaney et al.

It is certified that error appears in the above-identified patent and that said Letters Patent is hereby corrected as shown below:

<u>Column 8,</u>
Line 64, before the word "comprising" please change "flirther" to -- further --.

Signed and Sealed this

Sixth Day of May, 2003

JAMES E. ROGAN
*Director of the United States Patent and Trademark Office*